United States Patent Office 3,504,244
Patented Mar. 31, 1970

3,504,244

CERAMIC CAPACITOR AND METHOD OF MANUFACTURE

Minoru Chiba, Yukio Fujimoto, and Koichi Mitsui, Kyoto, Japan, assignors to Nichicon Capacitor Ltd., Kyoto, Japan, a company of Japan Filed May 3, 1968, Ser. No. 726,328
Claims priority, application Japan, June 17, 1967, 42/38,699, 42/51,800
Int. Cl. H01g *1/00;* H02b *1/04, 9/00*
U.S. Cl. 317—258 8 Claims

ABSTRACT OF THE DISCLOSURE

A ceramic capacitor having a ceramic dielectric, silver layers formed on said dielectric and at least one of said layers having an outer layer of a metal having negligible affinity for silver and a low contact resistance, and a method of manufacturing such a capacitor wherein the substrate and overlying metal layers are severed into smaller bodies to provide micro-miniaturized capacitors.

This invention relates to a novel and improved ceramic capacitor utilizing silver for the electrode plates and more specifically to a micro-miniaturized capacitor that is particularly useful in connection with integrated circuitry. The invention further concerns a novel and improved method for manufacturing a micro-miniaturized capacitor.

Ceramic capacitors of known constructions embody layers of silver adhered by a heating process to opposing major surfaces of a ceramic substrate consisting of a material having a high dielectric constant such as barium titanate. The opposing silver layers form the electrode plates and the utilization of silver increases the capacitance beyond that obtainable with other metals. It is difficult, however, to attach lead wires to the silver layers and at the same time maintain a relatively low contact resistance. Bonding of the lead wires is especially difficult when the capacitor is made very small. For example, if a lead wire is bonded to an electrode plate using solder and if the plate is as small as 1 mm.$^2$ the area required for bonding the lead will correspond to the total area of the electrode plate. Thus the soldering operation not only becomes difficult but the silver will diffuse into the relatively large quantity of soldering material which has an affinity for silver. This results in a decrease of the thickness of the silver layer which adversely affects the characteristics of the electrodes. Furthermore, the affinity of silver for a semiconductor material is very small and direct bonding of silver to silicon or other semi-conductor layers which would form part of an integrated circuit by means of cold or thermocompression bonding, high frequency bonding or the like other than soldering does not afford the desirable low resistivity characteristic. Still further while precious metals such as gold palladium, and aluminum are useful as the contact conductors for connection to associated circuits, silver cannot be satisfactorily bonded to these materials by means other than soldering, and accordingly, such capacitors have not been found satisfactory for use in practical miniaturized applications. Accordingly, it is one object of this invention to provide an improved ceramic capacitor utilizing silver layers as the electrode plates and which plates are provided with over lying layers of precious metals such as palladium and the like, aluminum or semiconductor materials which are directly bonded to the silver by means other than soldering and which bonding means will not damage the silver layers and will afford low contact resistance.

Another object of the invention resides in the provision of a novel and improved method for making an improved ceramic capacitor suitable for mass production.

A still further object of the invention resides in the provision of a novel and improved micro-miniaturized capacitor having very low contact resistivity.

The above and other objects of the invention will become more apparent from the following description and accompanying drawings forming part of this application.

FIGURES 1 through 4 are cross-sectional views showing successive steps in the manufacture of a ceramic capacitor in accordance with conventional practice;

FIGURES 5 through 7 illustrate successive steps in the manufacture of a ceramic capacitor in accordance with the invention;

FIGURE 8 is a plan view of the structure shown in FIGURE 7 preparatory to sectioning in order to form a plurality of miniaturized capacitors;

FIGURE 9 is an enlarged perspective view of a single capacitor in accordance with the invention;

FIGURE 10 is a cross-sectional view of the structure shown in FIGURE 9 with the lead wires attached and embedded in a protective enclosure; and FIGURE 11 is a cross-sectional view of a capacitor in accordance with the invention and embodied in an integrated circuit.

For illustrative purposes, the prior art process for forming capacitors is illustrated in FIGURES 1 through 4. A high dielectric ceramic material such as barium titanate powder and a suitable binder is formed into a rectangular sheet 1 which is then fired in the usual manner. This sheet constitutes the so-called substrate of the capacitor. Silver layers 2 are then baked onto the opposing major surfaces of the substrate 1 as illustrated in FIGURE 2. The substrate and the silver layers form the basic capacitor and the capacitance is determined by the dielectric constant of the substrate, the thickness of the substrate, and the area of the opposing electrodes 2. When silver is utilized as the electrodes 2, the capacitance of the resultant capacitor is greater than when utilizing other metals so that silver is preferred. It is believed that the improvement in capacitance results from the improved adhesion of the silver and the substrate.

The capacitor as illustrated in FIGURE 2 is not particularly satisfactory if connected directly to a transistor or diode because of the relatively high resistance entailed in making the connections to the silver electrodes. Accordingly, a normal procedure for attaching lead wires is illustrated in FIGURE 3. In this figure the lead wires 3 are soldered to the plates as indicated at 4 and the completed capacitor is then enclosed in a surrounding body of plastic material 5 as illustrated in FIGURE 4.

The method of attaching the lead wires 3 to the capacitor as illustrated in FIGURES 3 and 4 entails material difficulties particularly when the area of the electrodes is of the order of 1 mm.$^2$ or smaller. Under such conditions, the diameter of the lead wires 3 and the length of the wire required to enable it to be soldered to the electrodes become so small that the soldering operation is exceedingly difficult. Furthermore, the silver which forms the electrodes will be diffused into the solder, and as a result, the thickness of the electrodes is decreased which results in modification of the characteristics of the capacitor. Efforts have been made to utilize such means as cold compression bonding, or high frequency bonding to attach the lead wires to the silver electrodes, but such procedures have not been found satisfactory because the affinity of silver for the metal of the lead wire, which in many cases may be gold, is very small. Silver does not adhere to such semiconductor materials such as silicon and germanium, and accordingly, it is extremely difficult to couple such a capacitor to a semiconductor or even a conductor on an integrated circuit without utilizing a separate lead wire.

The instant invention provides an improved capacitor and method of manufacturing it which overcomes the foregoing difficulties. In accordance with the invention, the ceramic dielectric such as barium titanate is provided with the silver electrodes in the usual manner. A layer of metal selected from the group consisting of a semiconductor metal such as silicon or germanium, a precious or noble metal such as gold, palladium, or the like, alloys of a semiconductor metal and a precious metal and aluminum is then coated onto the silver layers. The metal coatings on the silver layers make it possible to either directly bond or connect the layers through a lead wire to associated circuitry including an integrated circuit formed on a semiconductor body and at the same time maintain contact resistance at a minimum and without the need for soldering procedures.

The invention also enables the manufacture of a microminiaturized ceramic capacitor by forming the capacitor as described above and then dividing the resultant structure into a plurality of very small capacitors. More specifically and with reference to FIGURES 5 through 10, the ceramic dielectric or substrate 11 is prepared in the same manner as described in connection with FIGURE 1. The surface area of the substrate 11 is selected so that the finished structure can be severed into a plurality of smaller units as will be described. The substrate 11 is then provided with electrodes 12 of silver on the opposing major surfaces in much the same manner as described in connection with FIGURE 2.

In accordance with the invention, the silver layers 12 are then provided with overlying layers 13 as shown in FIGURE 7. These overlying layers may be formed from a precious metal such as gold or palladium or they may be formed of a semiconductor metal such as silicon or germanium or an alloy of a semiconductor metal and a precious metal, or aluminum. In the formation of the metal layers 13 any suitable means such as sputtering, plating, baking or other suitable coating procedure may be employed.

The resultant structure as illustrated in FIGURE 7 is then sectioned as shown in FIGURE 8 to form a plurality of individual capacitors 14. Any suitable severing procedure may of course be employed such as etching or cutting and the resultant capacitors are minute structures which can have a surface area of 1 mm.$^2$ or smaller. Each of the individual capacitors as illustrated in greatly enlarged form in FIGURE 9 can be bonded to the desired portion of a circuit without utilizing a soldering process as the bonding can be accomplished by any suitable means such as cold or thermocompression bonding, high frequency bonding or the like. In this way contact resistivity can be maintained at a very low value. If lead wires are necessary, they can be readily bonded directly to the layers 13 as illustrated for instance in FIGURE 10 wherein the lead wires are denoted by the numeral 15. If desired, the entire capacitor can be embedded within an insulating body 16 of plastic material or the like. Inasmuch as the layers 13 can be readily bonded to a semiconductor substrate or an integrated circuit, the improved capacitor in accordance with the invention may be readily incorporated as a part of an integrated circuit.

Referring more specifically to FIGURE 11, it will be observed that one electrode 13 of the improved capacitor is bonded by means other than soldering to a conductive electrode 8 formed on the semiconductor substrate 17 of an integrated circuit. The other electrode 13 is connected by a lead wire 10 to an electrode 9 on the substrate 17 and it too may be bonded to the capacitor and to the electrode 9 by any suitable means other than soldering.

As described above, the ceramic capacitor in accordance with the invention may be in a micro-miniature form and utilizes electrodes formed of silver with overlying layers formed of either a precious metal, a semiconductor metal, an alloy of a precious or semiconductor metal, or aluminum which thus facilitates the incorporation of the capacitor into an electronic circuit without the need for soldering. Through the utilization of bonding processes other than soldering to effect the electrical connection, the contact resistance can be maintained at very low values which greatly improves the efficiency of the characteristics of the circuit and enables the fabrication of circuits having more uniform electrical properties. The metals and alloys of metals forming the group of metals that may be used in providing overlying or outer layers and the silver layer have common properties in that they can be bonded to the silver layers without damaging them, afford low contact resistance, and can in turn be bonded directly to lead wires or circuit elements without the need for soldering. Thus "direct bonding" as used herein means a bonding process that does not utilize solder as the connecting metal.

While only one embodiment of the invention has been illustrated and described, it is apparent that alterations, modifications and changes may be made without departing from the true scope and spirit thereof as defined by the appended claims.

What is claimed is:

1. A ceramic capacitor comprising a ceramic substrate having a pair of opposing surfaces, silver electrode layers adhered to said opposing surfaces and an overlying layer of a different metal selected from the group consisting of noble metals, aluminum, semiconductor metals, and alloys containing said metals directly bonded to at least one of said silver layers, the metal of said overlying layer forming a low contact resistance with said silver layer and having negligible affinity for silver.

2. A ceramic capacitor according to claim 1 wherein a conductor is compressively bonded directly to said overlying layer.

3. A ceramic capacitor according to claim 1 wherein a conductor is directly bonded to said overlying layer.

4. A ceramic capacitor according to claim 3 which includes an insulating body enclosing said substrate, electrodes and metal layer and a portion of said conductor.

5. The combination with ceramic capacitor according to claim 1 of a semiconductor substrate and wherein at least one of said overlying layers is directly bonded to the last said substrate whereby said capacitor may become part of an integrated circuit.

6. A ceramic capacitor comprising a ceramic substrate having a pair of opposing surfaces, silver electrode layers adhered to said opposing surfaces and an overlying layer of a different metal bonded to at least one of said silver layers, the metal of said overlying layer forming a low contact resistance with said silver layer and having negligible affinity for silver, the metal of said overlying layer being selected from the group consisting of gold, palladium, silicon, germanium, aluminum and alloys thereof.

7. The method of making a ceramic capacitor according to claim 1 including the steps of forming a thin plate of a ceramic having dielectric properties, forming a layer of silver on opposing surfaces of said plate, directly bonding an overlying layer to at least one of said silver layers, said overlying layer being a metal selected from the group consisting of noble metals, semiconductor metals, aluminum and alloys of said metals and then dividing the resultant body into a plurality of smaller bodies each including a portion of the substrate and said silver and overlying layers.

8. The method according to claim 7 including the step of directly bonding a conductor to at least one of said overlying layer of said smaller body.

References Cited

UNITED STATES PATENTS

| | | | |
|---|---|---|---|
| 2,389,420 | 11/1945 | Deyrup | 317—261 X |
| 2,585,752 | 2/1952 | Dorst | 29—25.42 |
| 2,758,267 | 8/1956 | Short | 317—258 X |
| 3,047,782 | 7/1962 | McCarthy | 317—242 |
| 3,138,744 | 6/1964 | Kilby. | |
| 3,235,939 | 2/1966 | Rodriguez. | |
| 3,264,535 | 8/1966 | Makihara | 317—258 |
| 3,293,514 | 12/1966 | Podolsky | 317—242 |

ELLIOT A. GOLDBERG, Primary Examiner

U.S. Cl. X.R.

29—25.42, 492; 317—101, 261